United States Patent
Teruhira

(10) Patent No.: US 10,310,320 B2
(45) Date of Patent: Jun. 4, 2019

(54) LIQUID CRYSTAL DISPLAY

(71) Applicant: Ortus Technology Co., Ltd., Hino (JP)

(72) Inventor: Junya Teruhira, Hino (JP)

(73) Assignee: ORTUS TECHNOLOGY CO., LTD., Hino (JP)

( * ) Notice: Subject to any disclaimer, the term of this patent is extended or adjusted under 35 U.S.C. 154(b) by 0 days.

(21) Appl. No.: 15/802,006

(22) Filed: Nov. 2, 2017

(65) Prior Publication Data

US 2018/0120630 A1 May 3, 2018

Related U.S. Application Data

(63) Continuation of application No. PCT/JP2016/062807, filed on Apr. 22, 2016.

(30) Foreign Application Priority Data

May 21, 2015 (JP) ................................. 2015-103627

(51) Int. Cl.
*G02F 1/1335* (2006.01)
*G02F 1/1339* (2006.01)
*G02F 1/1368* (2006.01)

(52) U.S. Cl.
CPC ...... *G02F 1/133514* (2013.01); *G02F 1/1368* (2013.01); *G02F 1/13394* (2013.01);
(Continued)

(58) Field of Classification Search
CPC ........... G02F 1/133514; G02F 1/13394; G02F 1/133512; G02F 1/1368; G02F 2001/13396; G02F 2201/52

See application file for complete search history.

(56) References Cited

U.S. PATENT DOCUMENTS

2004/0207781 A1* 10/2004 Yoshida ............ G02F 1/133514
349/108
2005/0046764 A1 3/2005 Enda et al.
(Continued)

FOREIGN PATENT DOCUMENTS

CN 102736292 A 10/2012
CN 102789086 A 11/2012
(Continued)

OTHER PUBLICATIONS

English Language Translation of International Preliminary Report on Patentability dated Nov. 30, 2017 in corresponding International Patent Application No. PCT/JP2016/062807.
(Continued)

*Primary Examiner* — Charles S Chang

(57) ABSTRACT

A liquid crystal display includes: a first substrate and a second substrate arranged to face each other; a liquid crystal layer provided between the first substrate and the second substrate; first and second color filters of different colors, which are provided on the first substrate and arrayed in a first direction; and a first spacer provided between the first substrate and the second substrate and configured to adjust thickness of the liquid crystal layer. Each of the first and second color filters includes a first portion extending in a second direction intersecting with the first direction, and a second portion connected to the first portion and projected in the first direction. The first spacer is provided on the second portion.

19 Claims, 7 Drawing Sheets

(52) U.S. Cl.
CPC .............. *G02F 1/133512* (2013.01); *G02F 2001/13396* (2013.01); *G02F 2201/52* (2013.01)

(56) References Cited

U.S. PATENT DOCUMENTS

| | | | |
|---|---|---|---|
| 2005/0179853 A1* | 8/2005 | Chen | G02F 1/13394 349/155 |
| 2011/0128480 A1* | 6/2011 | Liu | G02B 5/201 349/106 |
| 2012/0249901 A1 | 10/2012 | Sekine | |
| 2012/0293755 A1 | 11/2012 | Nagami | |

FOREIGN PATENT DOCUMENTS

| | | |
|---|---|---|
| JP | 6-110058 | 4/1994 |
| JP | 2007-52360 | 3/2007 |
| JP | 2009-237484 | 10/2009 |
| JP | 2011-112690 | 6/2011 |
| JP | 2012-159757 | 8/2012 |
| TW | I296346 | 5/2008 |
| WO | WO 2011/132439 A1 | 10/2011 |

OTHER PUBLICATIONS

International Search Report dated Jul. 12, 2016 in corresponding International Application No. PCT/JP2016/062807.

Written Opinion of the International Searching Authority dated Jul. 12, 2016 in corresponding International Patent Application No. PCT/JP2016/062807.

Taiwanese Office Action dated Nov. 24, 2016 in corresponding Taiwanese Patent Application No. 105113906.

Japanese Office Action dated Jan. 8, 2019 in Japanese Patent Application No. 2015-103627 (2 pages) (3 pages English Translation).

* cited by examiner

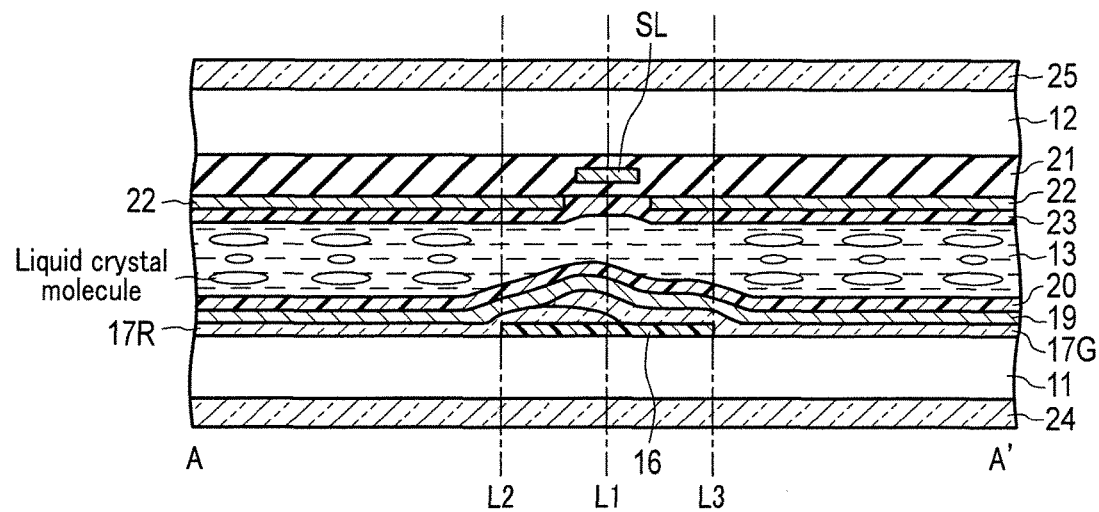
F I G. 2
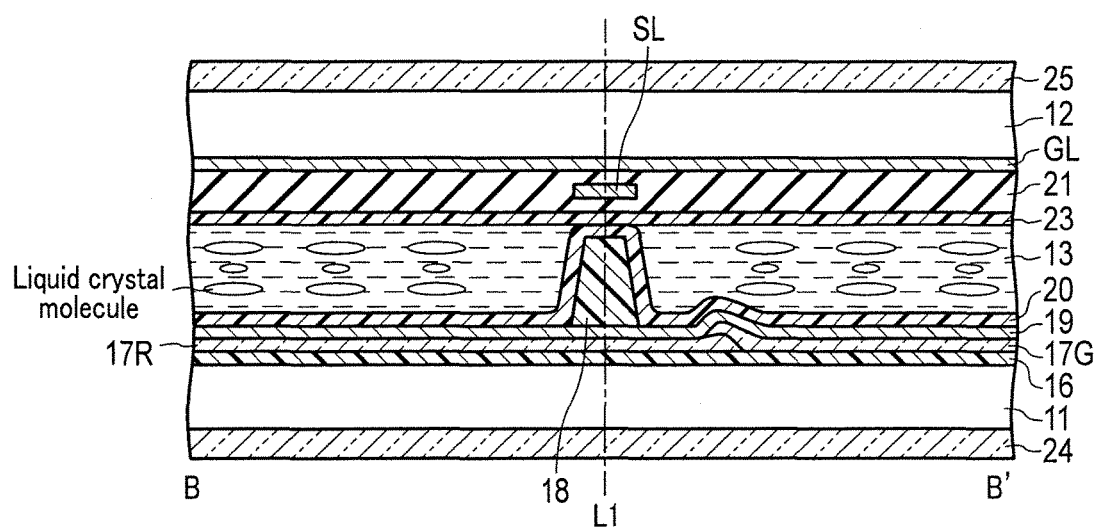
F I G. 3

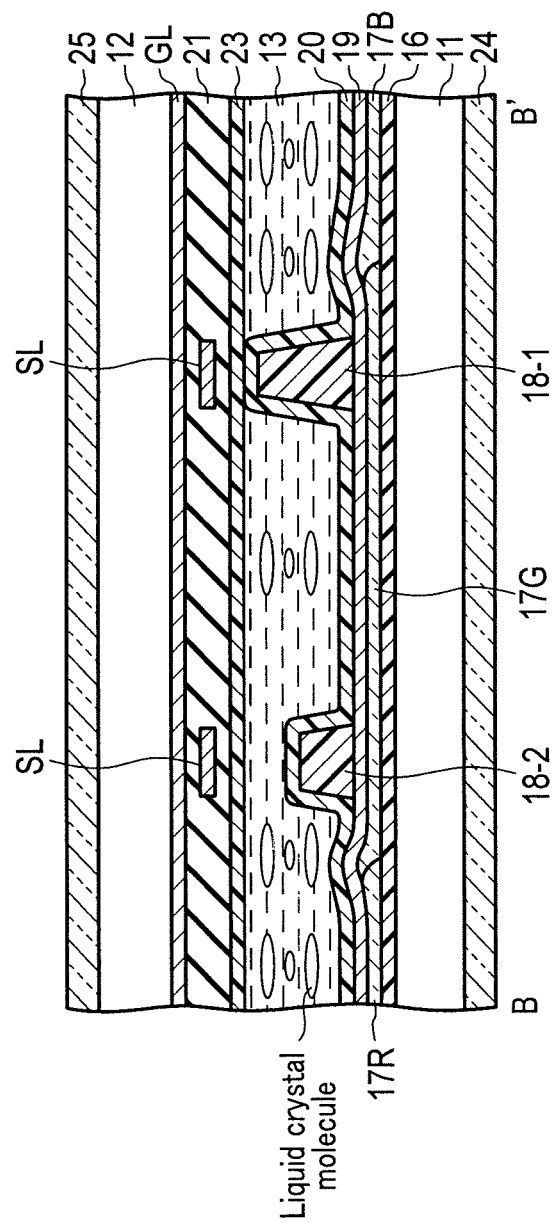
F I G. 10

LIQUID CRYSTAL DISPLAY

CROSS-REFERENCE TO RELATED APPLICATIONS

This application is a Continuation Application of PCT Application No. PCT/JP2016/062807, filed Apr. 22, 2016, and based upon and claiming the benefit of priority from Japanese Patent Application No. 2015-103627, filed May 21, 2015, the entire contents of all of which are incorporated herein by reference.

BACKGROUND OF THE INVENTION

1. Field of the Invention

The present invention relates to a liquid crystal display.

2. Description of the Related Art

A liquid crystal display is featured in that it is small in size, flat, light in weight and low in power consumption. The liquid crystal display is widely used as various types of displays, such as a mobile phone, a personal computer and a television set.

In this type of liquid crystal display, the liquid crystal layer sandwiched between a color filter substrate and a TFT substrate is made to have a predetermined thickness (cell gap) by providing a plurality of spherical or columnar members (referred to as spacers), which are made of glass or resin, inside the liquid crystal layer.

Since the spacers are foreign matters to the liquid crystals, the alignment of the liquid crystal molecules is disturbed in the neighborhood of the spacers and light may leak out in such portions, degrading the contrast of the liquid crystal display. As a result, the display performance of the liquid crystal display may deteriorate.

BRIEF SUMMARY OF THE INVENTION

According to an aspect of the present invention, there is provided a liquid crystal display comprising:

a first substrate and a second substrate arranged to face each other;

a liquid crystal layer provided between the first substrate and the second substrate;

first and second color filters of different colors, which are provided on the first substrate and arrayed in a first direction; and a first spacer provided between the first substrate and the second substrate and configured to adjust thickness of the liquid crystal layer, wherein each of the first and second color filters includes a first portion extending in a second direction intersecting with the first direction, and a second portion connected to the first portion and projected in the first direction, and the first spacer is provided on the second portion.

According to an aspect of the present invention, there is provided a liquid crystal display comprising:

a first substrate and a second substrate arranged to face each other;

a liquid crystal layer provided between the first substrate and the second substrate;

first and second color filters of different colors, which are provided on the first substrate and arrayed in a first direction; and a first spacer provided between the first substrate and the second substrate and configured to adjust thickness of the liquid crystal layer, wherein the first color filter includes a first portion extending in a second direction intersecting with the first direction, and a second portion connected to the first portion and being wider than the first portion, the second color filter includes a third portion extending in the second direction, and a fourth portion connected to the third portion and being narrower than the third portion, and the first spacer is provided on the second portion.

BRIEF DESCRIPTION OF THE SEVERAL VIEWS OF THE DRAWINGS

FIG. 2 is a sectional view of the liquid crystal display taken along line A-A' of FIG. 1.

FIG. 3 is a sectional view of the liquid crystal display taken along line B-B' of FIG. 1.

FIG. 10 is a sectional view of a liquid crystal display according to the third embodiment.

DETAILED DESCRIPTION OF THE INVENTION

A description will now be given of the embodiments with reference to the accompanying drawings. It should be noted that the drawings are schematic or conceptual, and the dimensions and scales of the drawings are not necessarily the same as the actual products. Where the same portion is depicted in different drawings, the dimensions and scale of one drawing may be different from those of another. Several embodiments described below merely show exemplary apparatuses and methods that implement the technical ideas of the present invention. The technical ideas are not limited by the element shapes, structures, arrangements etc. described below. In the description below, structural elements having substantially the same functions and configurations will be denoted by the same reference symbols, and a repetitive description of such elements will be given only where necessary.

First Embodiment

[1] Overall Structure of Liquid Crystal Display

Figure 1:
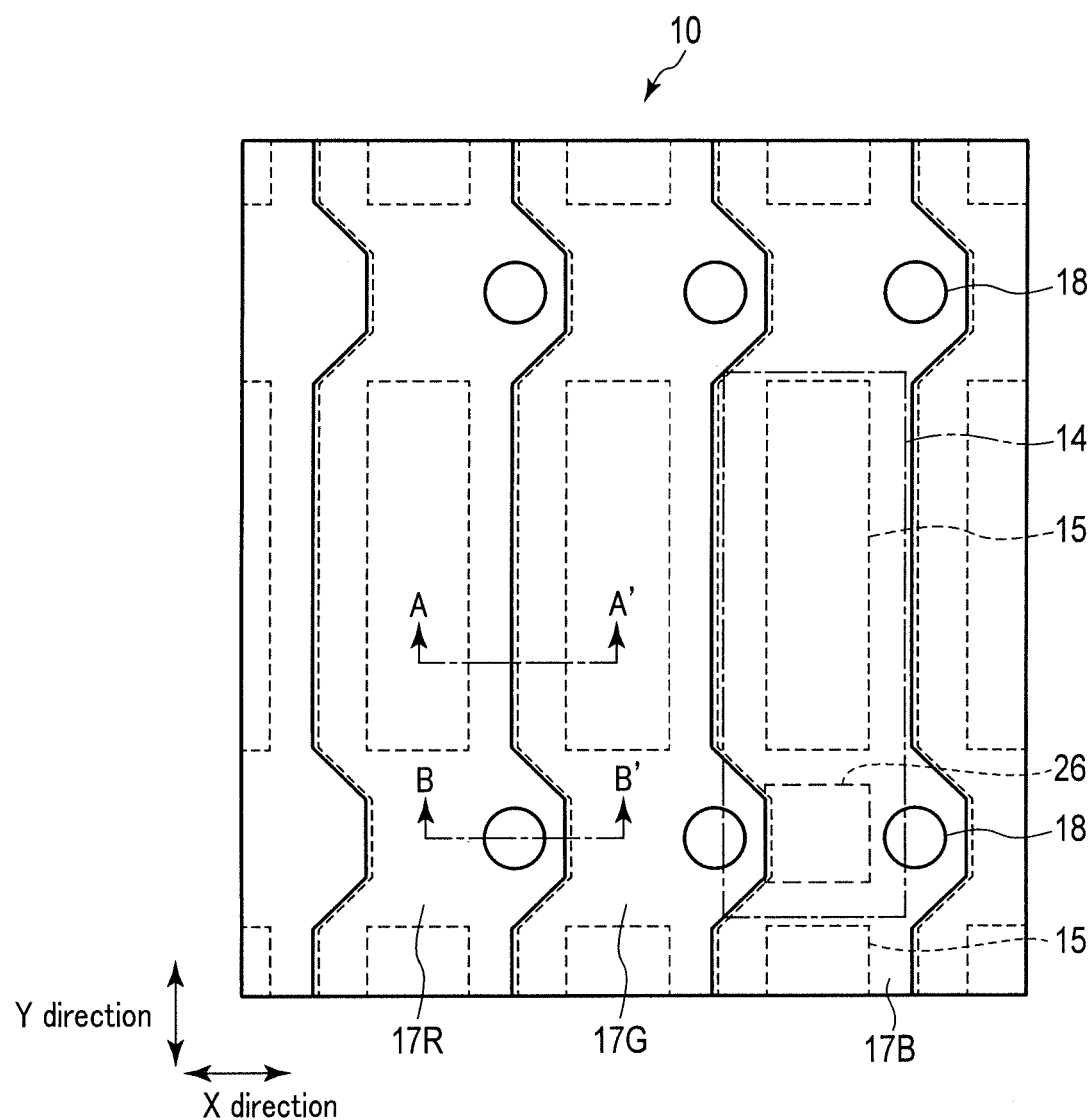
FIG. 1 is a plan view of a liquid crystal display according to the first embodiment.

FIG. 1 is a plan view of a liquid crystal display 10 of the first embodiment. FIG. 2 is a sectional view of the liquid crystal display taken along line A-A' of FIG. 1. FIG. 3 is a sectional view of the liquid crystal display 10 taken along line B-B' of FIG. 1.

The liquid crystal display 10 is provided with: a color filter substrate (CF substrate) 11 on which a color filter, a common electrode, etc. are formed; a TFT substrate 12 which is arranged to face the CF substrate 11 and on which a switching element, a pixel electrode, etc. are formed; and a liquid crystal layer 13 sandwiched between the CF substrate 11 and the TFT substrate 12. Each of the CF substrate 11 and the TFT substrate 12 is made of a transparent substrate (e.g., a glass substrate).

The liquid crystal layer 13 is made of a liquid crystal material sealed by a seal member (not shown), by which the CF substrate 11 and the TFT substrate 12 are pasted. The optical characteristics of the liquid crystal material vary when the alignment of the liquid crystal molecules is controlled in accordance with the electric field applied between the pixel electrode and the common electrode. Various liquid crystal modes can be used, including the vertical alignment (VA) mode, the twisted nematic (TN) mode, and homogeneous mode. The seal member 34 is formed, for example, of an ultraviolet curing resin, a thermosetting resin or a UV/heat combination type curing resin. In the manufacturing process, the resin is coated on the CF substrate 11 or the TFT substrate 12, and is cured by ultraviolet irradiation or heating.

The liquid crystal display 10 includes a pixel array in which a plurality of pixels 14 are arranged in a matrix. In FIG. 1, one of the pixels 14 is surrounded and indicated by the long dashed short dashed lines, and such pixels as shown in FIG. 1 are repeatedly arranged in both the X direction and the Y direction. Each pixel 14 is provided with an opening area (transmission area) 15. For example, light from a backlight passes through the opening area 15, thereby enabling image display. In FIGS. 2 and 3, the boundary between the pixels that are adjacent in the X direction is indicated by line L1, and ends of the openings of the pixels that are adjacent to each other, with line L1 interposed, are indicated by lines L2 and L3.

A black mask 16 for shielding the regions other than the opening area 15 from light (the black mask is referred to as a light-shielding film or a black matrix as well) is provided on that side of the CF substrate 11 which is closer to the liquid crystal layer 13. In FIG. 1, a plurality of opening areas 15 are partitioned by the black mask 16, and the areas other than the opening areas 15 are covered with the black mask 16. The black mask 16 is provided on the boundary between the adjacent pixels 14. The black mask 16 serves to shield the unwanted light between the adjacent pixels (between the adjacent color filters) and to enhance the contrast.

A plurality of color filters 17 are provided on the opening areas 15 and black mask 16 of the CF substrate 11. The color filters 17 include a plurality of coloring filters (coloring layers). Specifically, the color filters 17 include a plurality of red filters 17R, a plurality of green filters 17G and a plurality of blue filters 17B. General color filters include filters of light's three primary colors, namely, red (R), green (G) and blue (B). An adjacent set of pixels of R, G and B colors functions as a unit of display (a pixel). Each of the single-color portions of one pixel is a minimum drive unit referred to as a sub pixel (sub picture element). The switching element and the pixel electrode are provided for each sub pixel. In the descriptions below, the sub pixels will be referred to simply as pixels, provided that the pixels and the sub pixels do not have to be discriminated from each other.

In the present embodiment, the color filter arrangement method is a so-called stripe arrangement in which a red filter 17R, a green filter 17G and a blue filter 17B are arranged in the X direction in the order mentioned. The color filter arrangement method is not limited to this, and other arrangement methods such as a delta arrangement and a mosaic arrangement may be applicable.

The adjacent filters overlap slightly at the boundary, so that there is no gap between the adjacent filters. A more specific structure of the color filters 17 will be described later.

A common electrode 19 is provided on the color filters 17. The common electrode 19 as a planar electrode is provided entirely in the display area of the liquid crystal display 10.

A plurality of columnar spacers 18 for adjusting the thickness (cell gap) of the liquid crystal layer 13 are provided on the common electrodes 19. Although one spacer 18 is arranged for each pixel in FIG. 1, the number of spacers 18 can be optionally determined. For example, one spacer 18 may be provided for every three pixels 14, or the spacers may be arranged at a more coarse density.

The common electrode 19 and the spacers 18 are overlaid with an alignment film 20. In the state where no electric field is applied (initial state), the alignment film 20 controls the alignment of the liquid crystal layer 13.

On that side of the TFT substrate 12 which is closer to the liquid crystal layer 13, switching elements 26 are provided for the respective pixels 14. Each switching element 26 is, for example, a thin film transistor (TFT) or an n-channel TFT. Although only one of TFTs 26 is surrounded and indicated by the broken lines in FIG. 1 to avoid complicating the drawings, TFTs 26 are provided for the respective pixels 26.

To be specific, a scanning line GL functioning as the gate electrode of TFT 26 is provided on that side of the TFT substrate 12 which is closer to the liquid crystal layer 13. The scanning line GL extends in the X direction between the opening areas 15 that are adjacent in the Y direction. TFT 26 is arranged in the pixel area such that it is located between the opening areas 15 that are adjacent in the Y direction and overlaps the black mask 16. TFT 26 includes a gate electrode (scanning line GL), a gate insulating film (part of an insulating layer 21) located on the gate electrode, a semiconductor layer (not shown) located on the gate insulating layer, and a source electrode (not shown) and a drain electrode (not shown) which are formed on the semiconductor layer and are provided away from each other.

A signal line (source line) SL is provided on the scanning line GL, with part of the insulating layer 21 being interposed. The source line SL extends in the Y direction between the opening areas 15 that are adjacent in the X direction. The source line SL is electrically connected to the source electrode of TFT 26.

Part of the insulating layer 21 is provided on the source line SL. A pixel electrode 22 is provided on the insulating layer 21. The pixel electrode 22 is provided for each of the pixels 14. When viewed in the plan view, the pixel electrode 22 has a size larger than the opening area 15 of the pixel 14, and is formed to cover the opening area 15. The pixel electrode 22 is electrically connected to the drain electrode of TFT 26.

The pixel electrode 22 is overlaid with an alignment film 23. In the state where no electric field is applied (initial state), the alignment film 23 controls the alignment of the liquid crystal layer 13.

Circular polarizers 24 and 25 are provided such that they sandwich the CF substrate 11 and the TFT substrate 12. Each of circular polarizers 24 and 25 includes a retardation plate (¼ wavelength plate) and a polarizing plate (linear polarizer).

In the plane perpendicular to the light traveling direction, the polarizing plate has a transmission axis and an absorption axis perpendicular to each other. Of the light whose oscillation planes are in random directions, the linearly-polarized light (linearly-polarized components of light) having oscillation planes parallel to the transmission axis are allowed to pass through the polarizing plate, while the linearly-polarized light (linearly-polarized components of light) having oscillation planes parallel to the absorption axis are absorbed by the polarizing plate. The two polarizing plates are arranged, with their transmission axes being perpendicular to each other. That is, the polarizing plates are arranged in the orthogonal nicol state.

The retardation plates have refractive index anisotropy, and in the plane perpendicular to the light traveling direction they have a slow axis and a fast axis perpendicular to each other. The retardation plates have the function of providing a predetermined retardation between the light of predetermined wavelength that has passed through the slow axis and the light of predetermined wavelength that has passed through the fast axis (the retardation is a phase difference of λ/4 provided that the wavelength of the light is λ). The slow axis of the retardation plates is set to form approximately 45° with respect to the transmission axis of the polarizing plates.

The angles mentioned above in connection with the polarizing plates and retardation plates may include errors caused for attaining desirable operations and errors attributable to the manufacturing process. For example, the above-mentioned angle of approximately 45° is assumed to include an angle range of 45°±5°. For example, being "perpendicular" is assumed to include an angle range of 90°±5°.

The common electrode 19 and the pixel electrode 22 are transparent electrodes and are formed, for example, of indium tin oxide (ITO). The insulating layer 21 is made of a transparent insulating material; it is formed of silicon nitride (SiN), for example. The black mask 16 is a laminated film including chromium oxide and chromium (Cr) stacked in order; alternatively, the black mask 16 is made of black resin.

The spacers 18 are made of transparent resin. For example, the spacers 18 are made of photocurable resin and worked in a photolithography method.

Aluminium (Al), molybdenum (Mo), chromium (Cr), tungsten (W), or an alloy containing at least one kind of these materials is used as the material of the scanning line GL and source line SL. Desirably, the scanning line GL and the source line SL should be formed of a conductive material whose optical density (OD) is a large value.

[2] Details of Color Filters

Figure 4:
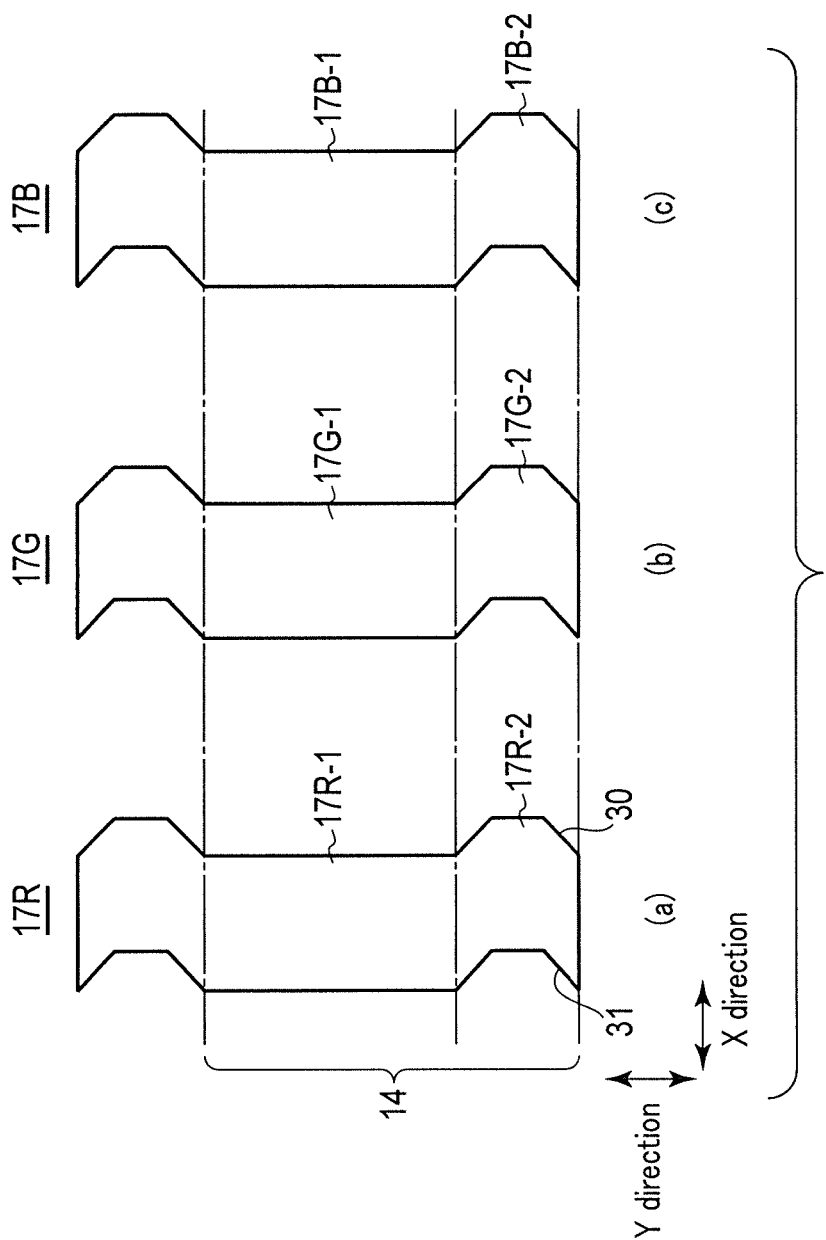
FIG. 4 is a plan view illustrating a color filter, a green filter and a blue filter which are depicted in FIG. 1.

Next, a description will be given of a detailed structure of the color filters 17 mentioned above. FIG. 4 is a plan view illustrating a red filter 17R, a green filter 17G and a blue filter 17B which are depicted in FIG. 1.

The red filter 17R is corrugated and extends in the Y direction. To be specific, the red filter 17R corresponding to one pixel 14 includes a first portion 17R-1 extending in the Y direction and a second portion 17R-2 connected to one end of the first portion 47R-1. The second portion 47R-2 is formed such that it is projected in the X direction from one end of the first portion 17R-1. For example, the second portion 17R-2 has the same width as the first portion 17R-1. The second portion 17R-2 includes a convex portion 30 projected in the X direction from a first side face of the first portion 17R-1, and a concave portion 31 depressed in the X direction from a second side face (i.e., the side face opposite to the first side face) of the first portion 17R-1. In other words, the center of the second portion 17R-2, as viewed in the X direction, is shifted from the center of the first portion 17R-1, as viewed in the X direction.

Each of the green filter 17G and the blue filter 17B has the same shape as the red filter 17R. Like the red filter 17R, the green filter 17G includes a first portion 17G-1 and a second portion 17G-2 connected to one end of the first portion 17G-1. The blue filter 17B includes a first portion 17B-1 and a second portion 17B-2 connected to one end of the first portion 17B-1.

A spacer 18 is provided for at least one of the second portions 17R-2, 17G-2 and 17B-2, with the common electrode 19 interposed. The spacer 18 is arranged at an X-direction end of at least one of the second portions 17R-2, 17G-2 and 17B-2. The spacer 18 is also arranged at the boundary between the pixels that are adjacent in the X direction.

As described above, the number and density of the spacers 18 can be optimally determined. More desirably, the spacers 18 should be arranged only on the color filters of the same color. With this structure, even where the red filter 17R, the green filter 17G and the blue filter 17B are different in thickness, the spacers 18 are allowed to have uniform height, for example by providing the spacers 18 only on the green filters 17G.

With the above structure, since the spacers 18 are arranged on flat portions, they have uniform height. As a result, the thickness of the liquid crystal layer 13, which is adjusted by the spacers 18, can be made uniform in the entire display area.

[3] Comparative Example

Figure 5:
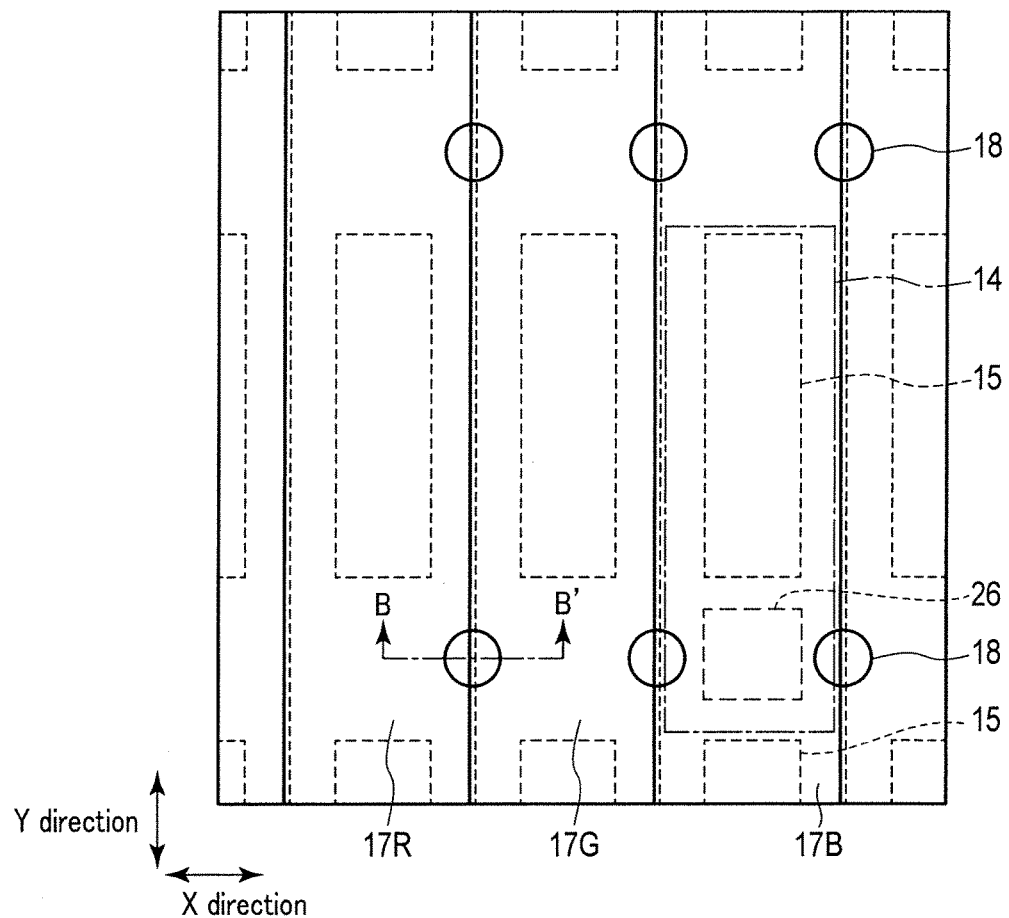
FIG. 5 is a plan view of a liquid crystal display according to a comparative example.
Figure 6:
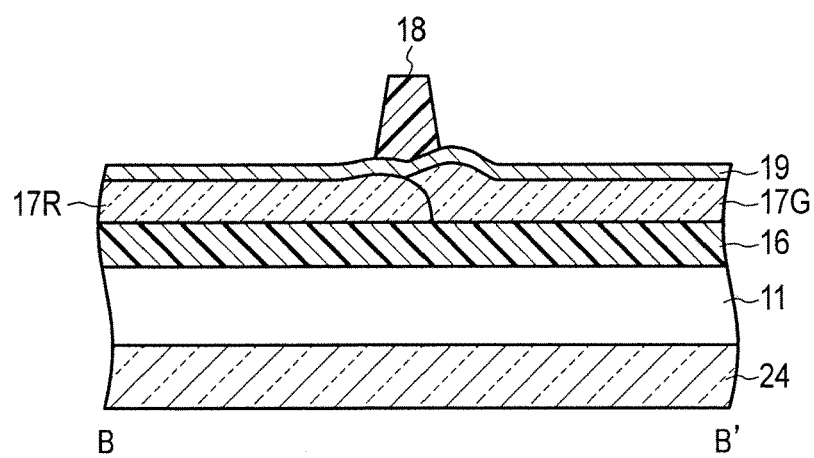
FIG. 6 is a sectional view of the liquid crystal display taken along line B-B' of FIG. 5.

A comparative example will be described below. FIG. 5 is a plan view of a liquid crystal display according to a comparative example. FIG. 6 is a sectional view of the liquid crystal display taken along line B-B' of FIG. 5.

In the comparative example, a red filter 17R, a green filter 17G and a blue filter 17B are formed to be linear. A spacer 18 is arranged at the boundary between the red filter 17R and the green filter 17G.

In the comparative example, spacers are different in height, due to the manner in which the color filters overlap and due to the thickness variations between the color filters of different colors. Owing to this, the thickness of the liquid crystal layer cannot be made uniform in the entire display area. As a result, the display property of the liquid crystal display may deteriorate. In the present embodiment, in contrast, the spacers 18 have substantially the same height, and the thickness of the liquid crystal layer can be made uniform.

[4] Advantages

As detailed above, in the first embodiment, the liquid crystal display 10 is provided with: a plurality of color filters (a plurality of red filters 17R, a plurality of green filters 17G and a plurality of blue filters 17B) provided on the CF substrate 11; and a plurality of spacers 18 provided between the CF substrate 11 and the TFT substrate 12 and serving to adjust the thickness of the liquid crystal layer 13. The red filter 17R includes a first portion 17R-1 extending in the Y direction and a second portion 17R-2 connected to the first portion 17R-1 and projected in the X direction. Each of the green filter 17G and the blue filter 17B has the same shape as the red filter 17R. The spacer 18 is provided for the second portion of at least one of the red filter 17R, green filter 17G and blue filter 17B.

In the first embodiment, the spacers 18 are arranged on flat portions and therefore have uniform height. As a result, the thickness of the liquid crystal layer 13, which is adjusted by the spacers 18, can be made uniform in the entire display area. As a result, the optical characteristics of the liquid crystal display 10 can be improved.

In addition, the spacer 18 is arranged at an X-direction end of at least one of the second portions 17R-2, 17G-2 and 17B-2. In other words, the spacer 18 is located at a position far from the opening area 15. With this structure, the spacer 18 causes little disturbance to the liquid crystal alignment in the opening area 15, and the liquid crystal alignment can be stabilized in the opening area 15. As a result, the display characteristics of the liquid crystal display 10 can be improved.

The spacer 18 is arranged at a position other than the region in which TFT 26 is arranged. With this arrangement, the spacer 18 does not apply pressure to TFT 26, so that the spacer 18 does not degrade the operating characteristics of TFT 26.

Second Embodiment

In the first embodiment, the red filter 17R, the green filter 17G and the blue filter 17B have the same shape. In the second embodiment, adjacent color filters have different shapes, and spacers are arranged on color filters of the same color.

Figure 7:
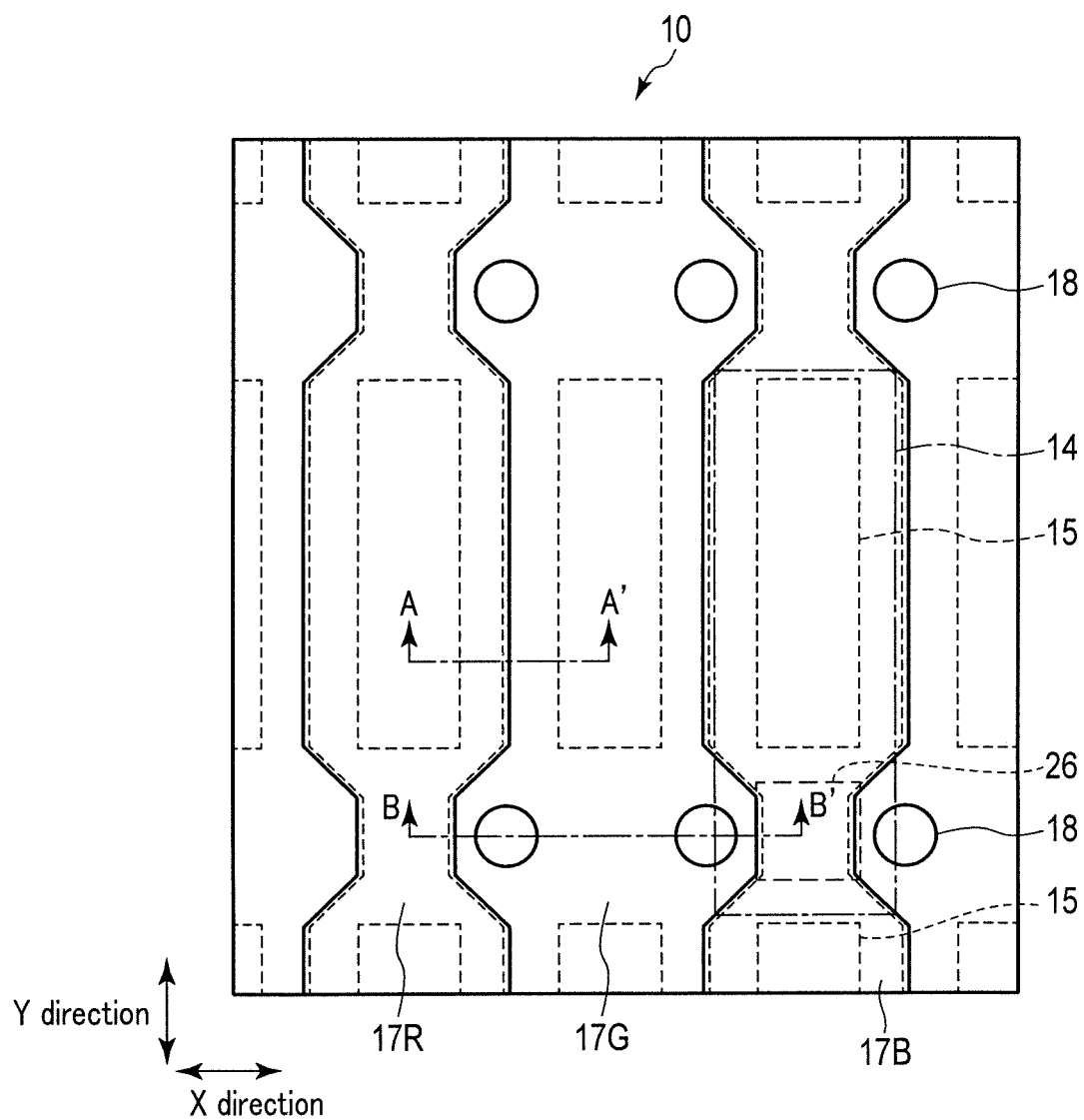
FIG. 7 is a plan view of a liquid crystal display according to the second embodiment.
Figure 8:
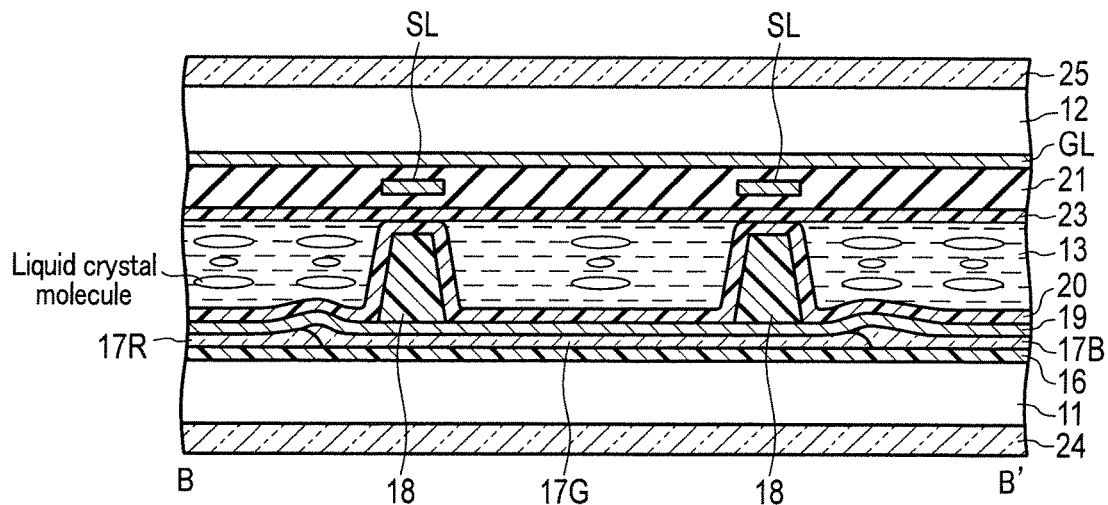
FIG. 8 is a sectional view of the liquid crystal display taken along line B-B' of FIG. 7.

FIG. 7 is a plan view of a liquid crystal display 10 of the second embodiment. FIG. 8 is a sectional view of the liquid crystal display 10 taken along line B-B' of FIG. 7. The sectional view of the liquid crystal display 10 taken along line A-A' of FIG. 7 is the same as the sectional view shown in FIG. 2 in connection with the first embodiment.

The stacked structure of the liquid crystal display 10 of the second embodiment is similar to that of the liquid crystal display 10 of the first embodiment. In the second embodiment, a red filter 17R, a green filter 17G and a blue filter 17B have different planar shapes from those of the first embodiment.

Figure 9:
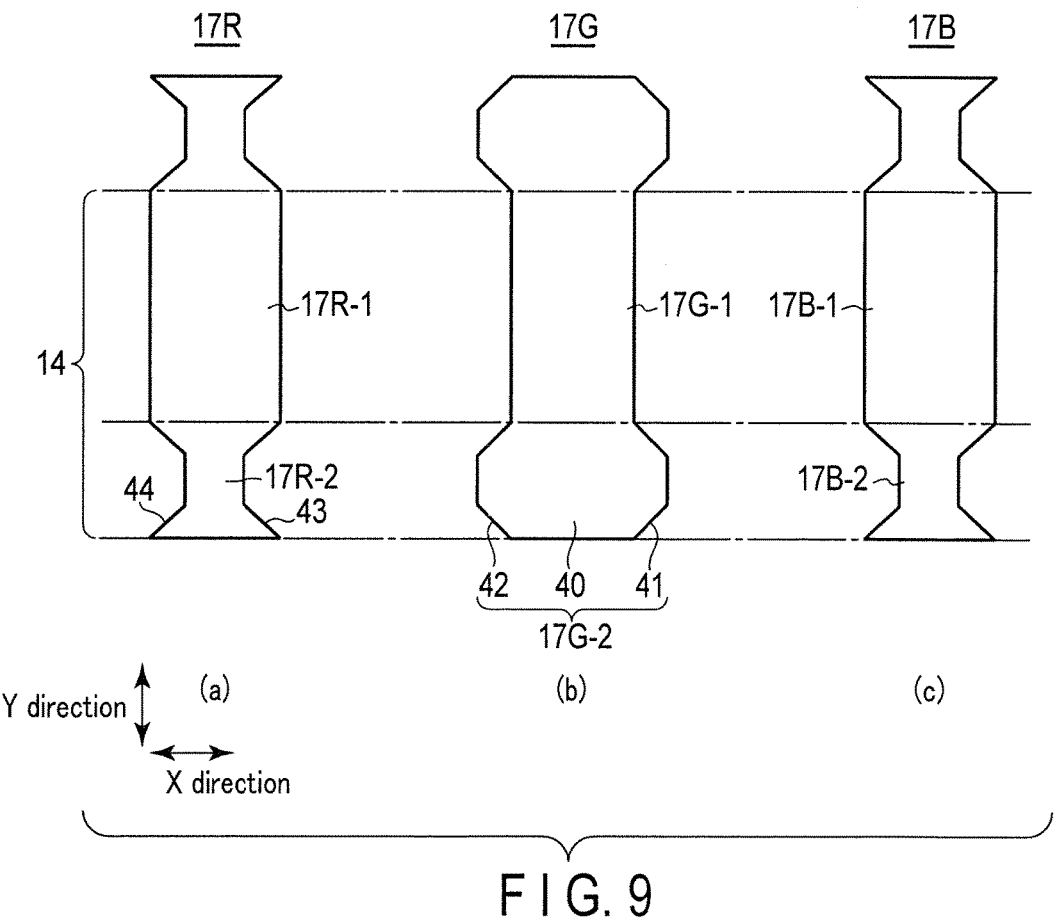
FIG. 9 is a plan view illustrating a color filter, a green filter and a blue filter which are depicted in FIG. 7.

FIG. 9 is a plan view illustrating the red filter 17R, green filter 17G and blue filter 17B which are depicted in FIG. 7.

Each of the side surfaces of the green filter 17G is corrugated and extends in the Y direction. To be specific, the green filter 17G corresponding to one pixel 14 includes a first portion 17G-1 extending in the Y direction and a second portion 17G-2 connected to one end of the first portion 17G-1. The second portion 17G-2 is formed such that it is projected in the X direction from the side faces of the first portion 17G-1. The second portion 17G-2 has a width greater than that of the first portion 17G-1. To be more specific, the second portion 17G-2 includes a base portion 40 having an equal width to that of the first portion 17G-1, convex portion 41 projected in the X direction from the base portion 40, and convex portion 42 projected in the opposite direction to that of convex portion 41.

Each of the side surfaces of the red filter 17R is corrugated and extends in the Y direction. To be specific, the red filter 17R corresponding to one pixel 14 includes a third portion 17R-1 extending in the Y direction and a fourth portion 17R-2 connected to one end of the third portion 17R-1. The fourth portion 17R-2 is formed such that it is depressed in the X direction from the side faces of the third portion 17R-1. The fourth portion 17R-2 has a width less than that of the third portion 17R-1. In other words, the fourth portion 17R-2 includes concave portion 43 depressed in the X direction from a first side face of the third portion 17R-1, and concave portion 44 depressed in the X direction from a second side face (the side face opposite to the first side face) of the third portion 17R-1.

The blue filter 17B adjacent to the green filter 17G has the same shape as the red filter 17R.

In the present embodiment, a color filter having projected portions and a color filter having depressed portions are arranged in order in the X direction. In the example shown in FIG. 9, the red filter that is adjacent to the blue filter 17B on the right side is a color filter having convex portions (the color filter has the same planar shape as the green filter 17G shown in FIG. 9). Likewise, the blue filter 17B that is adjacent to the red filter 17R on the left side is a color filter having convex portions (the color filter has the same planar shape as the green filter 17G shown in FIG. 9). If attention is paid to the color filters of the same color, it can be understood that a color filter having convex portions and a color filter having concave portions are alternately arranged.

It should be noted that a spacer 18 is provided for the second portion 17G-2 having convex portions, with the common electrode 19 interposed. The spacer 18 is arranged at an X-direction end of the second portion 17G-2. The spacer 18 is also arranged at the boundary between the pixels that are adjacent in the X direction. As described above, the number and density of spacers 18 can be optimally determined.

In the second embodiment, the spacers 18 are arranged on flat portions and therefore have uniform height. As a result, the thickness of the liquid crystal layer 13, which is adjusted by the spacers 18, can be made uniform in the entire display area. The other features of the second embodiment are similar to those of the first embodiment.

Third Embodiment

In the third embodiment, not only main spacers for adjusting the thickness of a liquid crystal layer 13 but also sub spacers lower than the main spacers are provided.

FIG. 10 is a sectional view of a liquid crystal display 10 of the third embodiment. A plan view of the liquid crystal display 10 of the third embodiment and a sectional view of the liquid crystal display 10 taken along line A-A' are similar to those of the second embodiment.

The liquid crystal display 10 is provided with a plurality of main spacers 18-1 and a plurality of sub spacers 18-2. The main spacers 18-1 are spacers for adjusting the thickness of the liquid crystal layer 13. The sub spacers 18-2 are spacers for ensuring sufficient mechanical strength of the liquid crystal display 10 when the screen of the liquid crystal display 10 is strongly pressed. Except for the sub spacers 18-2, the structure of the third embodiment is similar to that of the second embodiment.

If the thickness of the liquid crystal layer is strongly fixed using spacers of the same height, air bubbles may be generated in the liquid crystal layer when a shock is exerted on the liquid crystal display 10 used in a cold environment. In the third embodiment, the thickness of the liquid crystal layer is fixed by means of the main spacers, and sufficient mechanical strength of the liquid crystal display 10 is ensured by means of the sub spacers even if the liquid crystal display 10 is strongly pushed. The number and density of main spacers 18-1 and those of sub spacers 18-2 can be optimally determined. The other advantages of the third embodiment are similar to those of the second embodiment.

The third embodiment was described on the assumption that the liquid crystal display 10 is similar to that of the second embodiment, but the third embodiment is applicable to the first embodiment as well. To be more specific, in the plan view shown in FIG. 1, the spacers 18 includes main spacers 18-1 and sub spacers 18-2 lower than the main spacers 18-2.

In the first to third embodiments mentioned above, the spacers are formed on the CF substrate 11. In place of this structure, spacers may be first formed on the TFT substrate 12, and then the TFT substrate 12 and the CF substrate 11 may be pasted to each other.

Each of the above-mentioned embodiments is applicable to every type of liquid crystal display using color filters. For example, each embodiment is applicable to transmissive, reflective and semi-transmissive liquid crystal displays.

The liquid crystal display of each of the foregoing embodiments is applicable to various electronic devices having the image display function. For example, the liquid crystal display can be applied to a mobile device (such as a mobile phone, a mobile information terminal, a smartphone or a tablet terminal), a game console, a notebook personal computer (PC), a television set, a digital video camera, a digital still camera, a scanner, etc.

In the present specification, the terms "plate" and "film" are exemplary expressions of members and do not limit the structures of the members. For example, the retardation plates are not limited to plate-like members; they may be films or any other types of members having the function described in the specification. The polarizers are not limited to plate-like members; they may be films or any other types of members having the function described in the specification.

The present invention is not limited to the above-mentioned embodiments, and can be reduced to practice by modifying the constituent elements without departing from the spirit and scope of the invention. In addition, the above-described embodiments include inventions of various stages, and a variety of inventions can be derived by properly combining structural elements of one embodiment or by properly combining structural elements of different embodiments. For example, if the object of the invention is achieved and the advantages of the invention are attained even after some of the structural elements disclosed in connection with the embodiments are deleted, the structure made up of the resultant structural elements can be extracted as an invention.

What is claimed is:

1. A liquid crystal display comprising:
a first substrate and a second substrate arranged to face each other;
a liquid crystal layer provided between the first substrate and the second substrate;
first and second color filters of different colors, which are provided on the first substrate and arrayed in a first direction; and
a first spacer provided between the first substrate and the second substrate, to adjust thickness of the liquid crystal layer,
wherein
each of the first and second color filters includes
a first portion extending in a second direction intersecting with the first direction, and
a second portion connected to the first portion and projected in the first direction,
an end of the first color filter and an end of the second color filter overlap to form an overlapping portion, and
the first spacer is provided on a portion of the second portion other than the overlapping portion.

2. The liquid crystal display according to claim 1, wherein the second portion includes a convex portion projected in the first direction from a first side face of the first portion and a concave portion depressed in the first direction from a second side face of the first portion.

3. The liquid crystal display according to claim 1, wherein a width of the second portion equal to a width of the first portion.

4. The liquid crystal display according to claim 1, wherein the first spacer is arranged at an end of the second portion in the first direction.

5. The liquid crystal display according to claim 1, wherein the first spacer is arranged at a boundary between adjacent pixels of the liquid crystal display.

6. The liquid crystal display according to claim 1, wherein each of the first and second filters is corrugated.

7. The liquid crystal display according to claim 1, further comprising:
a switching element provided on the second substrate, wherein the first spacer is arranged in an area other than an area where the switching element is provided.

8. The liquid crystal display according to claim 1, further comprising:
a light-shielding film provided between the first substrate and the first and second color filters and defining an opening area of a pixel of the liquid crystal display, wherein the first spacer is arranged above the light-shielding film.

9. The liquid crystal display according to claim 1, further comprising:
a second spacer which is lower than the first spacer, wherein
the first color filter includes a plurality of first portions including the first portion and a plurality of second portions including the second portion, in which the plurality of first portions and the plurality of second portions repetitively alternate, and
the second spacer is provided on one of the plurality of second portions.

10. A liquid crystal display comprising:
a first substrate and a second substrate arranged to face each other;
a liquid crystal layer provided between the first substrate and the second substrate;
first and second color filters of different colors, which are provided on the first substrate and arrayed in a first direction; and
a first spacer provided between the first substrate and the second substrate, to adjust thickness of the liquid crystal layer,
wherein
the first color filter includes
a first portion extending in a second direction intersecting with the first direction, and
a second portion connected to the first portion and being wider than the first portion,
the second color filter includes
a third portion extending in the second direction, and
a fourth portion connected to the third portion and being narrower than the third portion, and
the first spacer is provided on the second portion.

11. The liquid crystal display according to claim 10, wherein
the second portion includes a first convex portion projected in the first direction from a first side face of the first portion and a second convex projected in the first direction from a second side face of the first portion, and
the fourth portion includes a first concave portion depressed in the first direction from a first side face of the third portion and a second concave portion depressed in the first direction from a second side face of the third portion.

12. The liquid crystal display according to claim 10, wherein the first spacer is arranged at an end of the second portion in the first direction.

13. The liquid crystal display according to claim 10, wherein the first spacer is arranged at a boundary between adjacent pixels of the liquid crystal display.

14. The liquid crystal display according to claim 10, wherein each of side faces of the first color filter is corrugated.

15. The liquid crystal display according to claim 10, further comprising:
a switching element provided on the second substrate,
wherein the first spacer is arranged in an area other than an area where the switching element is provided.

16. The liquid crystal display according to claim 10, further comprising:
a light-shielding film provided between the first substrate and the first and second color filters and defining an opening area of a pixel of the liquid crystal display,
wherein the first spacer is arranged above the light-shielding film.

17. The liquid crystal display according to claim 10, further comprising:
a second spacer which is lower than the first spacer, wherein
the first color filter includes a plurality of first portions and a plurality of second portions which repetitively alternate,
the second spacer is provided on one of the second portions.

18. The liquid crystal display according to claim 10, wherein an end of the first color filter and an end of the second color filter overlap to form an overlapping portion, and
the first spacer is provided on a portion of the second portion other than the overlapping portion.

19. The liquid crystal display according to claim 10, further comprising:
a second spacer provided on the second portion,
wherein the first spacer and the second spacer are arranged at both ends of the second portion in the first direction.

* * * * *